United States Patent
Camp, Jr. et al.

(10) Patent No.: US 8,050,405 B2
(45) Date of Patent: Nov. 1, 2011

(54) SHARED KEY ENCRYPTION USING LONG KEYPADS

(75) Inventors: William O. Camp, Jr., Chapel Hill, NC (US); Daniel P. Homiller, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1767 days.

(21) Appl. No.: 11/240,543

(22) Filed: Sep. 30, 2005

(65) Prior Publication Data
US 2007/0076877 A1 Apr. 5, 2007

(51) Int. Cl.
H04L 9/00 (2006.01)
H04L 9/08 (2006.01)
G06F 7/58 (2006.01)

(52) U.S. Cl. ........ 380/260; 380/262; 380/280; 713/150; 713/171; 708/250; 708/251; 708/300

(58) Field of Classification Search ............... 726/17–20, 726/26–30; 713/182–186, 171; 380/247–250, 380/260–262, 283, 280
See application file for complete search history.

(56) References Cited

U.S. PATENT DOCUMENTS

| | | | | |
|---|---|---|---|---|
| 4,125,744 A * | 11/1978 | Goodall | ........................... | 380/27 |
| 4,633,515 A * | 12/1986 | Uber et al. | ................. | 455/161.3 |
| 5,438,622 A * | 8/1995 | Normile et al. | ................. | 380/46 |
| 5,483,598 A * | 1/1996 | Kaufman et al. | ............... | 380/43 |
| 5,745,571 A * | 4/1998 | Zuk | ............................... | 380/285 |
| 5,850,444 A * | 12/1998 | Rune | ............................... | 705/79 |
| 6,021,203 A * | 2/2000 | Douceur et al. | ............... | 380/252 |
| 6,292,896 B1 * | 9/2001 | Guski et al. | ................... | 713/169 |
| 6,862,354 B1 | 3/2005 | McGrew et al. | | |
| 6,868,495 B1 * | 3/2005 | Glover | .......................... | 713/190 |
| 7,213,149 B2 | 5/2007 | Mache | | |
| 2002/0035697 A1 * | 3/2002 | McCurdy et al. | ............. | 713/200 |
| 2003/0026431 A1 * | 2/2003 | Hammersmith | ............... | 380/277 |
| 2003/0142821 A1 * | 7/2003 | Ross | ............................... | 380/46 |
| 2003/0149869 A1 * | 8/2003 | Gleichauf | ...................... | 713/153 |
| 2004/0014437 A1 * | 1/2004 | Gerhaeuser et al. | ........ | 455/114.3 |
| 2004/0015693 A1 | 1/2004 | Kitazumi | | |

(Continued)

FOREIGN PATENT DOCUMENTS
DE 19523466 C1 * 4/1997
(Continued)

OTHER PUBLICATIONS
Nokia 9290 Communicator Security White Paper, 2001.*
(Continued)

Primary Examiner — Taghi Arani
Assistant Examiner — Thaddeus Plecha
(74) Attorney, Agent, or Firm — Myers Bigel Sibley & Sajovec

(57) ABSTRACT

Methods of securely communicating a message from a first terminal to a second terminal include generating a keypad including a random sequence of bits having a length L, encrypting the message at the first terminal using a bit string beginning at an offset O in the keypad, and transmitting the encrypted message and an indicator of the offset O to the second terminal. A communication terminal includes a controller, a communication module configured to establish a location-limited communication channel, and an encryption unit configured to store a keypad including a random sequence of bits having a length L, to encrypt an outgoing message using the keypad, and to decrypt an incoming message using the keypad.

21 Claims, 9 Drawing Sheets

U.S. PATENT DOCUMENTS

| | | | | |
|---|---|---|---|---|
| 2005/0097361 | A1* | 5/2005 | Apostolopoulos et al. | 713/201 |
| 2009/0006850 | A1* | 1/2009 | Birger et al. | 713/169 |

FOREIGN PATENT DOCUMENTS

| | | |
|---|---|---|
| EP | 1 104 960 A1 | 6/2001 |
| EP | 1 328 086 A1 | 7/2003 |
| JP | 55-55385 | 4/1980 |
| JP | 04-306760 | 10/1992 |
| JP | 2001-077630 | 3/2001 |
| JP | 2001-202014 | 7/2001 |
| JP | 2002-124960 | 4/2002 |
| JP | 2003-333023 | 11/2003 |
| WO | WO 03098868 A1 * | 11/2003 |

OTHER PUBLICATIONS

A.O. Salako. (2002) "Authentication in Ad hoc Networking" Proceedings, London Communication Symposium, University College London, Sep. 9-10, 2002.

Nokia Mobile Commerce: FAQ, www.forum.nokia.com/main.0,6566,1_80_30,00.html, accessed Sep. 22, 2004.

Nokia White Paper "Secure Identity in Mobile Financial Transactions," Jan. 2001.

Mobey Forum White Paper on Mobile Financial Services, Jun. 2003.

Stajano et al. "The Resurrecting Duckling: Security Issues for Ad-hoc Wireless Networks" *1999 AT&T Software Symposium*, Sep. 15, 1999.

DynaPass White Paper, www.april.se/english/dynapas_wp.asp, accessed Sep. 21, 2004.

Ubikey MIDIlet, Authentication solution for VPN and web-applications.

Vasco "DIGIPASS for Palm," 2003.

The MobilePass solution: Zero-footprinting strong authentication through text messaging. Available at www.securecomputing.com/indes.cfm?/skey=155&=1, accessed Sep. 21, 2004.

Boström et al. "Ericsson Mobile Operator WLAN solution," Ericsson Review No. 1, 2002.

Balfanz, et al. "Talking to Strangers: Authentication in Ad-Hoc Wireless Networks," Xerox Palo Alto Research Center, 2002.

Lehane et al. "Shared RSA Key Generation in a Mobile Ad Hoc Network," Dept. of Electrical and Electronic Engineering, Trinity College, Dublin, Ireland, 2003.

Pavlosoglou et al. "A Security Application of the Warwick Optical Antenna in Wireless Local and Personal Area Networks," Proceedings of the London Communications Symposium, pp. 225-228, Sep. 2002.

RGEC Report, Research & Technical Advice, vol. 3, "System Security," 1999.

International Search Report and Written Opinion for PCT/US2006/021602; date of mailing Jul. 5, 2007.

Menzes et al. *Handbook of Applied Cryptography*, CRC Press, LLC, USA, XP002439407 pp. 20-21, 33, 29-40, 169-173, 191-195, 330, 331, 362-363, 490, 491, 497-500, 505, 546-553, 568-569, (1997).

Written Opinion of the International Preliminary Examining Authority for PCT/US2006/021602; Nov. 9, 2007.

Office Action Corresponding to Japanese Patent Application No. 2008-533329 dated Mar. 4, 2011; 5 pages.

* cited by examiner

SHARED KEY ENCRYPTION USING LONG KEYPADS

FIELD OF THE INVENTION

The present invention relates to communications methods and apparatus, and more particularly, to communications methods and apparatus using data encryption.

BACKGROUND

Wireless communication between electronic devices may be accomplished using a wide variety of communication media, communication systems and communication standards. For example, portable electronic devices such as mobile telephones are typically configured to communicate via analog and/or digital wireless radio frequency (RF) telephone systems. Such devices may additionally be configured to communicate using wired and/or wireless local area networks (LANs), short range communication channels such as Bluetooth RF communication channels and/or infrared communication channels, and/or long range communication systems such as satellite communication systems.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly referred to as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in The Mobile Communications Handbook, edited by Gibson and published by CRC Press (1996).

Several types of access techniques are conventionally used to provide wireless services to users of wireless systems. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

In any communication system, a user may desire to send a message to an intended user without the message being read or altered by an unintended third party. Some communication media are inherently more secure than others. For example, communication media that are not under the control of the sender and receiver may be considered physically insecure, since a third party may eavesdrop on communications sent over the media. Some examples of such physically insecure communication media are RF and other non-directional wireless communication systems. In such systems, an eavesdropper having an antenna within range of the transmitter may intercept messages that were intended for another receiver without the sender realizing the message was received by the eavesdropper. The internet is another example of a physically insecure communication system, since messages sent over the internet may pass through uncontrolled network nodes, and may thus be viewable by anyone having access to the node.

In order to overcome the limitations of such systems, it is known to encrypt and decrypt messages using, for example a secret key, so that even if the message is intercepted by a third party, the message may not be understandable by the third party. A secret key that is known to both the sender and the receiver of the message is commonly referred to as a "symmetric" key. Symmetric key encryption systems may also be referred to as "private key" encryption systems.

In contrast to private key encryption systems, public key (or "asymmetric key") encryption systems use a public key to encrypt data and a private key, ostensibly known only to the recipient of the encrypted data, to decrypt the data. In a public key encryption system, data encrypted with a public key can generally only be decrypted with the corresponding private key. Likewise, data encrypted with a private key can only be decrypted with the corresponding public key. Such a feature is commonly used for authentication purposes, e.g. electronic signatures.

A number of key encryption algorithms, including public key encryption algorithms, have been developed. While potentially useful, such algorithms may be subject to attack by malicious parties. In addition, public key encryption algorithms may also be computationally expensive and may require the involvement of third party certificate authorities to ensure the authenticity of shared public keys.

In contrast to the physically insecure communication media described above, some communication channels may be inherently physically secure. For example, in point-to-point channels in which access to the communication media is physically secured, messages may be exchanged as clear text without significant risk of unwanted interception. The exclusive use of such systems may be severely limiting, however, since by definition such systems do not have the flexibility associated with communicating over widely distributed networks such as wireless RF networks and/or the internet. In many cases, and in particular in a mobile environment, a user may desire to send a message using a communication channel that is, at least in part, physically insecure. Moreover, even with data encryption, it will be appreciated that varying levels of encryption may provided which may result in varying levels of effective security. For example, some encryption protocols may use longer keys (e.g. 128 bits), while other protocols may use shorter keys (e.g. 64 bits).

SUMMARY

Methods of securely communicating a message from a first terminal to a second terminal according to some embodiments of the invention include generating a keypad including a random sequence of bits having a length L, encrypting the message at the first terminal using a bit string beginning at an offset O in the keypad, and transmitting the encrypted message and an indicator of the offset O to the second terminal.

Providing the keypad to the second terminal may include establishing a secure channel between the first terminal and the second terminal and transmitting the keypad from the first terminal to the second terminal over the secure channel.

Establishing a secure channel may include establishing a location-limited channel between the first terminal and the second terminal. Establishing a location-limited channel between the first terminal and the second terminal may include establishing an infrared communication channel, a direct cable connection or a Bluetooth communication channel between the first terminal and the second terminal.

Establishing a secure channel may include establishing a key-encrypted channel between the first terminal and the second terminal. Establishing a key-encrypted channel between the first terminal and the second terminal may include establishing a secret key encrypted communication channel between the first terminal and the second terminal using a secret key derived from a previously stored keypad. Establishing a key-encrypted channel may include establishing a public-key encrypted communication channel between the first terminal and the second terminal.

Encrypting the message at the first terminal may include performing an EXCLUSIVE OR operation between bits in the message and the bit string in the keypad.

Some methods according to embodiments of the invention may further include advancing an offset counter by a number equal to the number of bits used in the EXCLUSIVE OR operation.

In particular embodiments, the indicator of the offset O may be the offset O, or the indicator of the offset O may be an index number.

Some methods according to embodiments of the invention may further include encrypting the indicator of the offset O. Likewise, transmitting the encrypted message and the indicator of the offset O may include transmitting the encrypted message and the encrypted indicator of the offset O.

Some methods according to embodiments of the invention may further include generating a key digest from the keypad and transmitting the key digest to the second terminal along with the encrypted message.

Generating the keypad may include sampling a random noise source. In particular embodiments, the random noise source may include a radio receiver tuned to a channel with no signal present. In methods according to some embodiments of the invention, an output of the radio receiver is filtered with a filter having a frequency response that is inverse to the passband of the receiver to thereby generate a filtered noise signal. The filtered noise signal may be sampled to generate a random data sequence.

Some methods according to embodiments of the invention may further include increasing an offset counter after transmitting the encrypted message, checking the offset counter to determine an amount of unused keypad, and generating a new keypad responsive to the amount of unused keypad being less than a predetermined threshold value. A user of the first terminal may be authenticated prior to generating a keypad.

Some methods according to embodiments of the invention may further include associating the generated keypad with the first terminal and the second terminal.

Generating a keypad may include generating a keypad at a key server. Likewise, some method may include transmitting the keypad from the key server to the first and second terminals.

Some methods according to embodiments of the invention may further include calculating verification data at the first terminal, and transmitting the verification data along with the encrypted message to the second terminal. The verification data may include a message authentication code, a CRC or a checksum.

In some embodiments of the invention, the length of the keypad may be at least 1000 bits. In particular embodiments of the invention, the length of the keypad may be at least 1,000,000 bits.

A communication terminal according to some embodiments of the invention includes a controller, a communication module operatively controlled by the controller and configured to establish a location-limited communication channel, an encryption unit operatively controlled by the controller and including an encryption memory configured to store a keypad, an encryptor configured to encrypt an outgoing message using the keypad, and a decryptor configured to decrypt an incoming message using the keypad.

The terminal may be configured to generate the keypad by sampling a random data source. The communication module may be configured to establish an infrared connection, a Bluetooth connection and/or a direct cable connection with a second terminal. In some embodiments of the invention, the encryption memory may be not addressable by the controller.

A communication system according to some embodiments of the invention includes a first terminal configured to generate a keypad comprising a random sequence of bits having a length L, to establish a secure channel, and to transmit the keypad over the secure channel, and a second terminal configured to establish the secure channel with the first terminal and to receive the keypad over the secure channel. The first terminal may be further configured to encrypt a message using a bit string beginning at an offset O in the keypad, and to transmit the encrypted message and an indicator of the offset O to the second terminal over a physically insecure channel.

Methods of securely communicating a message from a first terminal to a second terminal according to some embodiments of the invention include generating a key comprising a random sequence of bits by sampling a random noise source, encrypting the message at the first terminal using the key, and transmitting the encrypted message to the second terminal. The random noise source may include a radio receiver tuned to a channel with no signal present.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
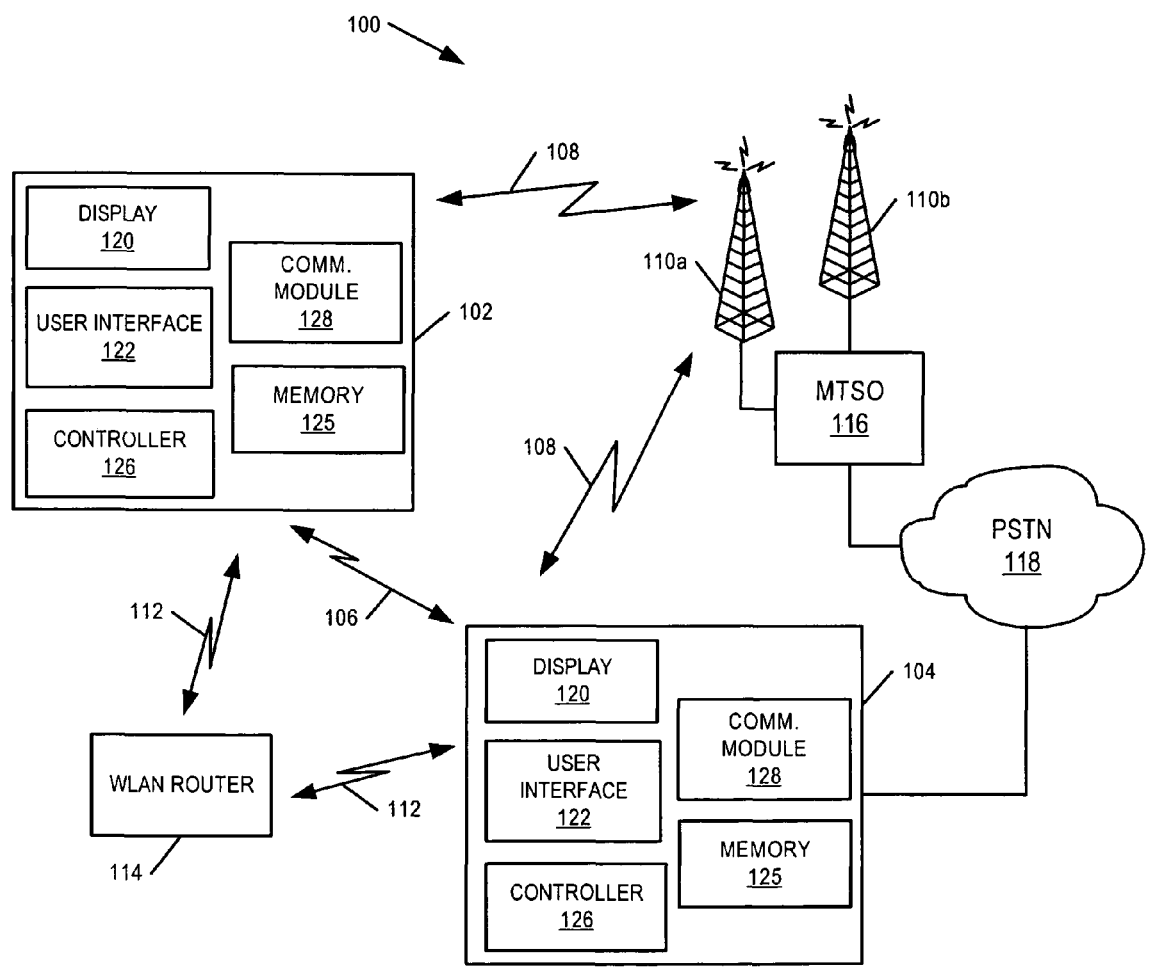
FIGS. 1-3 are schematic block diagrams illustrating wireless communication terminals and/or a cellular communication systems in accordance with some embodiments of the present invention.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), and/or another communication terminal. A communication terminal that is configured to communicate over a wireless interface may be referred to as a "wireless communication terminal" and/or a "wireless terminal." Examples of wireless terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

FIG. 1 is a schematic block diagram of a wireless communication system 100 that includes two communication terminals 102, 104 that are configured to communicate data with one another over a direct wireless communication interface 106, over another wireless communication interface 108 through one or more cellular base stations 110a-b, and/or over another wireless communication interface 112 through a wireless local area network (WLAN) access point 114. The direct wireless communication interface 106 may include an RF wireless communication interface such as a Bluetooth interface or an infrared communication interface such as for example, the infrared communication interface defined by the Infrared Data Association (IRDA) protocols. The IRDA defines a number of standards for infrared wireless data communication, including standards for infrared wireless communication at data rates up to 16 Mb/s. It will be appreciated that one or more of communication terminals 102, 104 may be handheld wireless communication terminals such as mobile telephones, PDAs, and the like. Alternatively or additionally, one or more of the terminals 102, 104 may be a fixed terminal such as, for example, a kiosk or server maintained at a vendor location. For example, in some embodiments, one of the terminals 102, 104 may be a kiosk at a bank or retail establishment.

As further illustrated in FIG. 1, the terminals 102, 104 may include a display device 120, a user interface 122, a controller 126, a communication module 128, and a nonvolatile memory 125.

The user interface 122 can include a keypad, keyboard, touchpad, jog dial and/or other user input device. The user interface 122 can also include a microphone coupled to an audio processor that is configured to generate an audio data stream responsive to sound incident on the microphone, and a speaker that generates sound responsive to an input audio signal. The communication module 128 is configured to communicate data over one or more of the wireless interfaces 106, 108, and/or 112 to another remote terminal 102, 104. The nonvolatile memory 125 is configured to store digital information even when power to the terminal 102, 104 is switched off.

The communication module 128 can include, for example, a cellular communication module, a Bluetooth module, an infrared communication module, and/or a WLAN module. With a cellular communication module, the terminals 102, 104 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b may be connected to a Mobile Telephone Switching Office (MTSO) 116 wireless network, which, in turn, is connected to a PSTN 118 and/or another network. With a Bluetooth or infrared module, the terminal 102, 104 can communicate via an ad-hoc network through the direct interface 106. With a WLAN module, the terminal 102, 104 can communicate through the WLAN router 114 using a communication protocol that may include, but is not limited to, 802.11a, 802.11b, 802.11e, 802.11g, and/or 802.11i. One or more of the terminals 102, 104 may also be configured to communicate directly over the PSTN 118 as shown in FIG. 1.

The terminals 102, 104 may be configured to transmit and/or receive a digital data signal between one another and/or with another communication terminal that may be communicatively coupled thereto through, for example the MTSO 116, the PSTN 118 and/or another network. However, it will be appreciated that data communication between terminals 102, 104 may be accomplished without using the MTSO 116 or the PSTN 118.

Figure 2A:
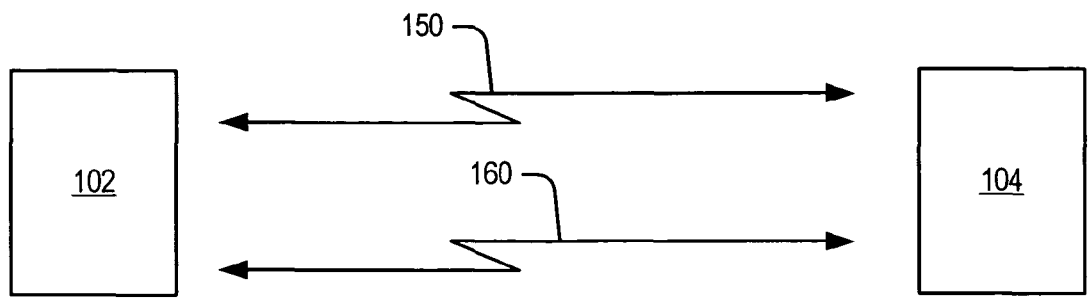

Referring now to the embodiments of FIG. 2A, communication pathways 150, 160 between terminals 102, 104 are illustrated schematically. As illustrated in FIG. 2A, one or more physically secure communication pathways 150 may be established between terminals 102, 104. For example, a direct wired link may be established between terminal 102 and terminal 104 by means of a universal serial bus (USB) cable, null modem cable, or other direct wired connection.

In some embodiments, a physically secure communication pathway 150 may be provided by a location-limited wireless channel such as an infrared communication link established between terminal 102 and terminal 104. With location-limited channels, a human operator may be able to precisely control which devices are communicating with each other. Thus, the possibility of an unwanted third party intercepting a communication may be greatly reduced. In addition, one of the communicating terminals 102, 104 may include, for example, a kiosk designed to facilitate establishment of a physically secure, location-limited link between the terminals 102, 104. For example, a kiosk-based terminal may include a shielded compartment into which a mobile terminal may be placed while the terminals are communicating. The shielding may prevent or reduce RF and/or infrared signals from being detected outside the kiosk while the terminals are in communication.

As discussed above, infrared wireless communication links may be capable of transmitting/receiving at relatively high data rates (e.g. 16 Mbit/sec). Moreover, infrared signals may be considered inherently location limited, in that they may provide line-of-sight communication pathways that do not travel through solid objects. Thus, infrared communication may provide an inherently physically secure data communication pathway 150 which may be employed without having to physically connect terminals 102, 104.

In addition, one or more physically insecure communication pathways 160 may be established between terminals 102, 104. As discussed above, communication pathways that pass at least partially over physically insecure communication media may be considered physically insecure, since a third party may intercept communications over the communication media. Users of terminals 102, 104 may rely on techniques such as data encryption to maintain privacy of communications over such communication pathways. Thus, it will be appreciated that it is possible to establish a private communication pathway over a physically insecure communication medium.

Figure 2B:
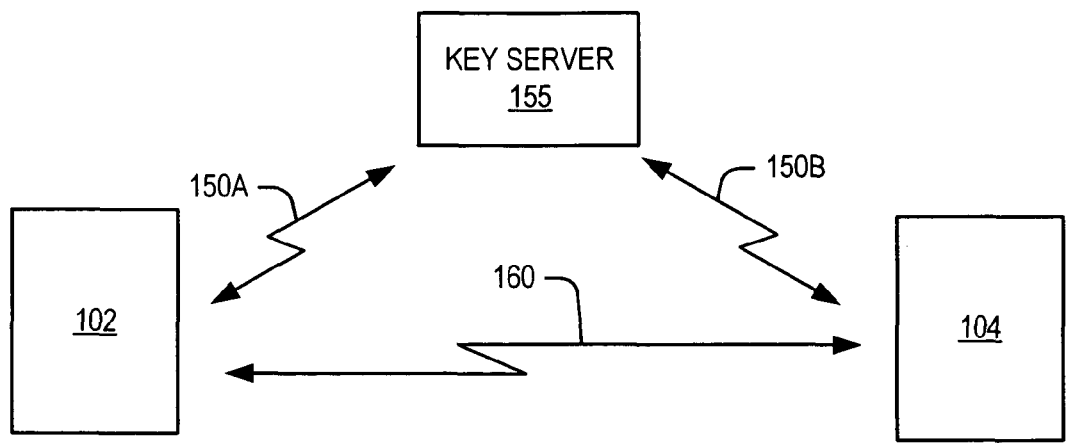

As illustrated in FIG. 2B, it may be possible for each of the terminals 102, 104 to establish physically secure communication pathways 150A, 150B with a third node such as a key server 155, which may be configured to facilitate the exchange of key information between the terminals 102, 104 as explained in greater detail below.

Figure 3:
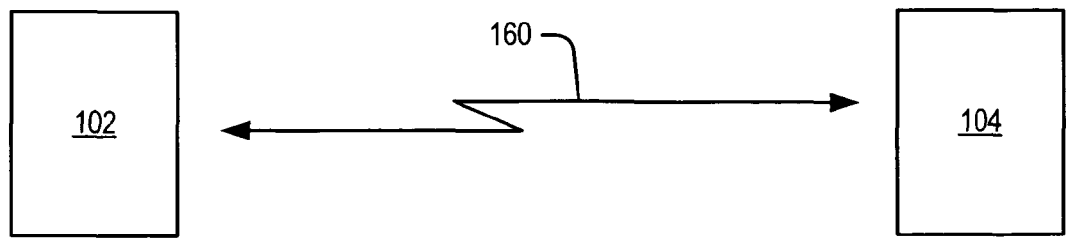

In some cases, as illustrated in FIG. 3, it may be impractical or impossible to establish a physically secure pathway between terminals 102, 104. For example, if the terminals 102, 104 are located far away from one another geographically and the only communication pathways available to the terminals 102, 104 include, at least in part, physically insecure communication pathways 160, it may be impossible to establish a physically secure pathway. In other cases, it may simply be inconvenient to establish a physically secure pathway between the terminals 102, 104 because of the physical proximity and/or infrastructure that may be required for such a pathway.

A user of a first terminal 102 may desire to send a private message to a user of a second terminal 104. As noted above, public key encryption algorithms have been developed that permit encryption and decryption of messages at a reasonable security level. Such systems may be useful where a user needs to communicate securely with a large number of other users. In many cases, however, a user of a wireless terminal may wish to exchange private messages with only a few other users such as, for example, close friends and/or associates of the user. In addition, a user may wish to send/receive private messages to/from a retail or financial institution, such as messages relating to purchases and/or banking transactions. In such cases it may be desirable to exchange secret keys with the other users to reduce the computational time and expense associated with the use of public key encryption systems. However, communications encrypted with secret keys may be subject to attacks, such as known-plaintext attacks, if the same secret key is used to encrypt multiple successive messages. For example, an attacker that has knowledge of the actual content of some of the encrypted data (or who correctly guesses some part of the data) may be able to recover the encryption key from the encrypted data. Regularly choosing a new secret key and sharing the key with the other party to mitigate the impact of a successful attack may be difficult and/or annoying for a user.

Accordingly, in some embodiments of the invention, a relatively long random data sequence S is generated at or provided to a terminal 102. In particular embodiments, the random data sequence S may be generated by the terminal 102. Thus, a separate step of providing the generated sequence S to the terminal 102 may not be necessary. The random data sequence S may be significantly longer than a typical 128 or 255 bit key. For example, the random data sequence S may be 1000 bits or more in length. In particular embodiments, the random data sequence S may be 1 Mbit (1,000,000 bits) or more in length.

For increased security, the random data sequence S may be generated from a true noise source instead of being, for example, a pseudorandom number generated using a typical seeded random number generation algorithm. A random data sequence may be obtained, for example, from the output of a radio receiver on a channel with no signal present and the gain turned up very high. Due to thermal noise present at the receiver, which is typically white, Gaussian noise, such a configuration may produce a bandwidth-limted noise sequence that may be corrected with a filter having a frequency response that is inverse to the passband of the receiver. The resulting signal may be sampled to provide a truly random data sequence S.

The random data sequence S is also provided to the second terminal 104, such that the random data sequence S constitutes a shared secret known to both terminals 102, 104. The random data sequence S may then be used as a keypad ("pad") for encrypting/decrypting messages sent between the terminals 102, 104 according to some embodiments of the invention.

Methods of securely communicating a message from a first terminal 102 to a second terminal 104 include generating a random sequence of bits having a length L (i.e. generating a keypad), and providing the keypad to the first terminal 102 and the second terminal 104. A message is encrypted at the first terminal 102 using, as an encryption key, a bit string beginning at an offset O in the keypad and having a length n. The encrypted message is transmitted to the second terminal 104 along with an indicator of the offset O. For example, an indicator of the offset O may be the offset O itself, or it may be an index number from which the offset may be derived. Whether or not an index number may be sent instead of the offset may depend on the type of encryption algorithm used, as explained in more detail below.

After the message is sent, a new offset O is calculated by the first terminal 102. A subsequent message sent by the first terminal 102 may be encrypted using a bit string beginning at the new offset O.

Figure 4:
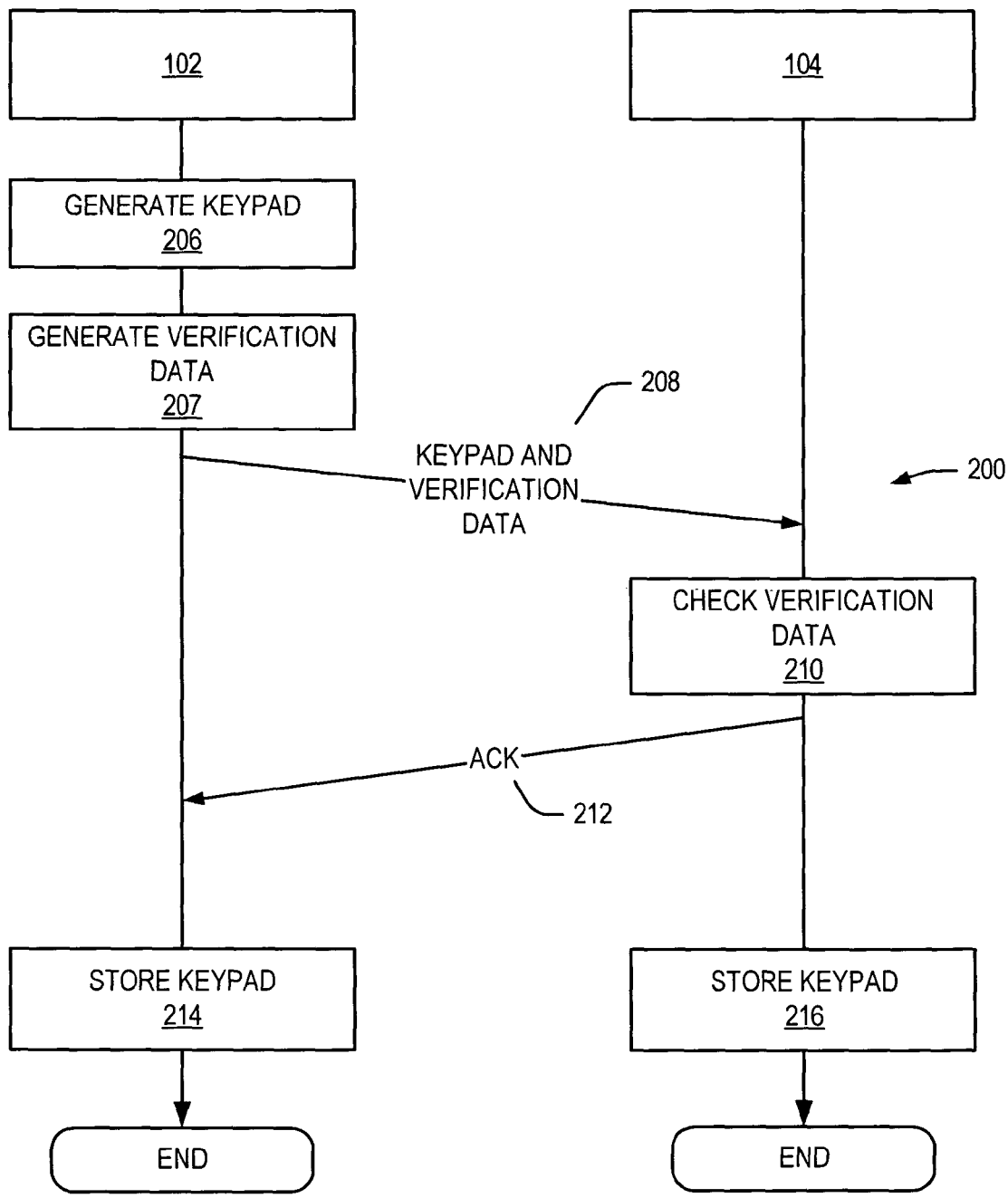
FIGS. 4-6 are flow diagrams illustrating operations according to some embodiments of the invention.

Operations associated with generating a random data sequence S to be used as a keypad are illustrated in the flow diagram of FIG. 4, in which a first terminal 102 and a second terminal 104 are provided. When it is desired to provide secure data communication between the first terminal 102 and the second terminal 104, the first terminal 102 may generate a keypad (block 206) by obtaining a random data sequence from a local noise source as described above. The first terminal 102 may then calculate verification data, such as a message authentication code (MAC), which may be, for example, a checksum or a cyclical redundancy code (CRC) generated from the keypad using a known algorithm (block 207). The keypad and the optional verification data are then transmitted to the second terminal 104 over a secure pathway. The secure pathway may be made over a physically secure communication medium such as a location-limited communication channel as described above. Alternatively, the secure pathway may be provided using encryption over a physically insecure communication medium. For example, as described above, when an old keypad is being replaced with a new keypad, the new keypad could be encrypted with the old keypad and transmitted over a physically insecure communication medium. Thus, in some embodiments, it may be possible to share a new keypad without re-establishing a physically secure communication link between the first terminal 102 and the second terminal 104.

The keypad and verification data are received at the second terminal 104, which checks the verification data (if any) provided by the first terminal 102 by recalculating the verification data from the received keypad and comparing it to the verification data provided by the first terminal 102 (block 210). If the calculated verification data is identical to the received verification data, there is a high probability the keypad was correctly received. In that case, the second terminal 104 provides an acknowledgment response (ACK) 212 to the first terminal 102 and stores the received keypad (block 216). Likewise, upon receipt of the ACK signal, the first terminal 102 stores the keypad (block 214).

Figure 5:
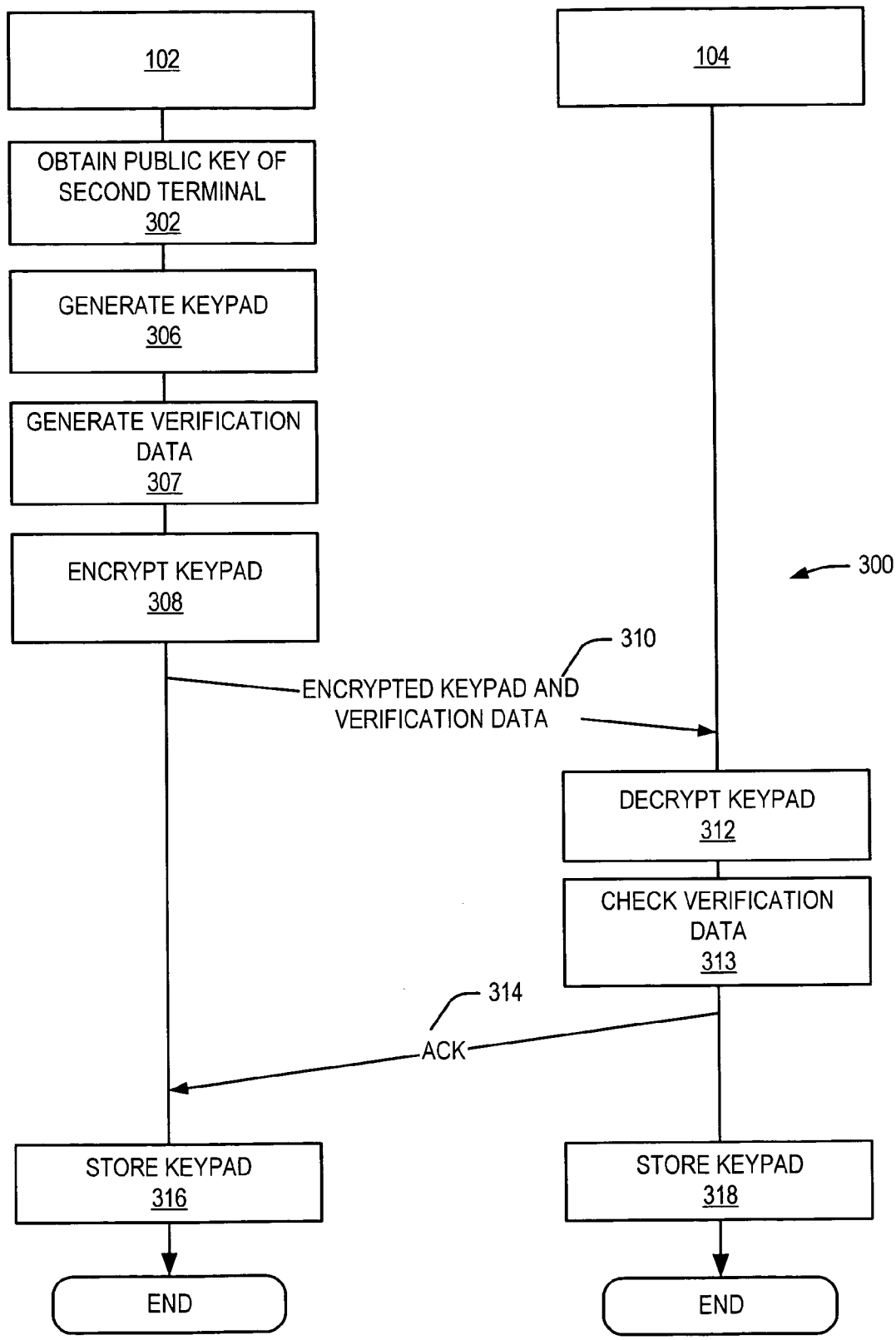

In cases where it is not possible to establish a physically secure communication link between the first and second terminals, the keypad may be exchanged over a communication link that is encrypted, as for example by using a previously stored keypad or by using a public/private key encryption algorithm. Some methods in which the keypad is exchanged over an encrypted communication link are illustrated in FIG. 5, in which a first terminal 102 and a second terminal 104 are provided. When it is desired to provide secure data communication between the first terminal 102 and the second terminal 104, the first terminal 102 may obtain the public key of the second terminal 104 (block 302). In some cases, the first terminal 102 may obtain the public key of the second terminal 104 directly from the second terminal 104. However, in order to avoid certain types of attacks, such as impostor, or man in the middle attacks, the first terminal 102 may verify the public key of the second terminal 104 with the use of certificates issued by a trusted certificate issuing authority.

Once the first terminal 102 has obtained the public key of the second terminal 104, the first terminal 102 may generate a keypad (block 306) by obtaining a random data sequence from a local noise source as described above. The first terminal 102 then calculates verification data, such as a message authentication code (MAC), which may be, for example, a checksum or a cyclical redundancy code (CRC) generated from the keypad using a known algorithm (block 307). The key and verification data are then encrypted using the public key of the second terminal 104 (block 308) and transmitted to the second terminal 104 (block 310).

The keypad and verification data are received at the second terminal 104, which decrypts the keypad and the verification data (if any) using its private key (block 312). The second terminal 104 then checks the verification data provided the first terminal 102 by recalculating the verification data from the received keypad and comparing it to the verification data provided by the first terminal 102 (block 313). If the calculated verification data is identical to the received verification data, there is a high probability the keypad was correctly received. In that case, the second terminal 104 provides an acknowledgment response (ACK) 314 to the first terminal 102 and stores the received keypad (block 318). Likewise, upon receipt of the ACK signal, the first terminal 102 stores the keypad (block 316).

When a new keypad is being generated to replace a previous keypad, then instead of using public key cryptography, the previous keypad or portions of the previous keypad may be used to encrypt the new keypad, so that the new keypad may be shared without having to re-establish a physically secure link as described above. For example, the new keypad could be encrypted bit-for-bit with the old keypad, or a relatively long key (e.g. 1024 bits or 2048 bits) may be extracted from the old keypad and used as a symmetric encryption key to encrypt the new keypad. In such cases, it may not be necessary to obtain and manage public encryption keys in order to update a keypad to a new keypad.

Associated with the establishment of the keypad, the first and second terminals 102, 104 may establish a static key kr which may be used, for example, to encrypt offset information to be used in a manner described in more detail below. The static key kr may in some cases simply be the first n bits of the keypad. In that case, the initial offset may be set at n+1 so that the initial key extracted from the keypad may not include the static key $k_r$. The first and second terminals 102, 104 may reset the static key $k_r$ from time to time.

Figure 6:
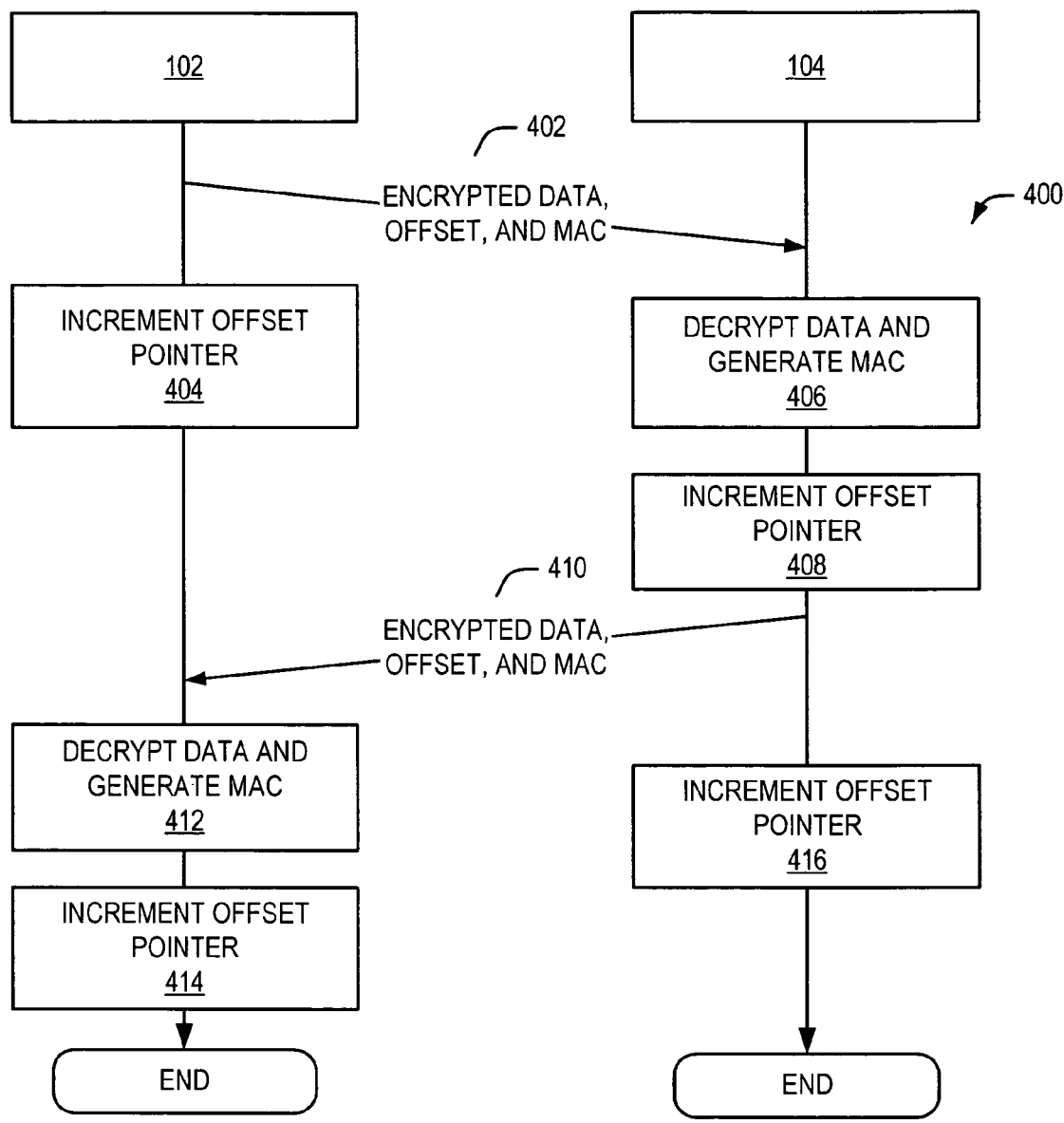

Once the keypad has been generated and shared between the first and second terminals 102, 104, the first and second terminals 102, 104 may establish a secure connection over an insecure communication medium using symmetric keys derived from the shared keypad. For example, as illustrated in FIG. 6, when a first terminal 102 wants to send an encrypted message to a second terminal 104 over an insecure communication medium, the first terminal 102 may encrypt the message using a key obtained from the keypad beginning at an offset O. The first terminal 102 may also generate a MAC field such as a CRC or checksum of the encrypted data and sends the encrypted data, the offset O, and the MAC field to the second terminal 104 (block 402).

The second terminal 104 receives the encrypted data, the MAC field and the offset from the first terminal 102. The second terminal 104 decrypts the data by obtaining the key from the locally stored copy of the keypad located at the offset O specified by the first terminal 102 (block 406). The second terminal 104 then checks the MAC field to determine if the data was altered during transmission. The second terminal 104 then increments the offset O to point to the next bit in the keypad following the key used to encrypt the data (block 408). Likewise, the first terminal 102 increments its offset pointer (block 404).

In a similar manner, when the second terminal 104 desires to send an encrypted message to the first terminal 102, the second terminal encrypts the message using the next available key in the keypad, generates a MAC and sends the encrypted message, the MAC and the offset of the key used to encrypt the message to the first terminal 102 (block 410). The second terminal 104 then increments its offset pointer to point to the next unused bit in the keypad (block 416).

The first terminal 102 receives the encrypted message and decrypts the message using the key located at the offset specified in the offset field provided by the second terminal 104 (block 412). The first terminal 102 checks the MAC to see if the message was altered and increments its offset pointer (block 414).

Encryption and decryption of the transmitted messages may be performed in a number of ways. For example, given the relatively large size of the keypad, if relatively small messages, such as text messages, banking instructions, or the like, are being transmitted between the terminals, it may be effective to encrypt the messages on a bit-by-bit basis such as, for example, by an EXCLUSIVE-OR operation. That is, each bit of a message may be EXCLUSIVE-OR'ed with a bit from the keypad to generate an encrypted bit. For example, suppose that the offset pointer at the first terminal 102 points to an offset O in the keypad, and the first terminal 102 desires to send an m-bit message to the second terminal 104. The first terminal 102 EXCLUSIVE-ORs each of the m bits of the message with bits O to O+m−1 of the keypad to generate an m-bit encrypted message. At the second terminal 104, the m-bit encrypted message is received along with the offset O. The second terminal 104 then EXCLUSIVE-OR's the received encrypted message with bits O to O+m−1 of the keypad to recover the original message.

Both the first terminal 102 and the second terminal 104 may then increment their offset pointers to O+m, so that when the next message is sent, the encryption key will begin with bit O+m of the keypad.

In some embodiments, the keypad may be used as a source of fixed-length secret encryption keys. For example, in some embodiments, the first terminal 102 and the second terminal 104 may use an n-bit key sequence K extracted from the L-bit random data sequence S (i.e. the keypad) as a secret key for encrypting and decrypting transmitted data using, for example, well-known data encryption algorithms such as AES (Advanced Encryption Standard) and/or DES (Data Encryption Standard). In such embodiments, each n-bit key sequence K in the L-bit random data sequence S may be referenced by an index number that may be sent along with the encrypted data in addition to or instead of the offset O.

For example, referring still to the embodiments of FIG. 6, the first terminal 102 may encrypt user data using an n-bit key sequence K, for example, sequence Ki) located in the L-bit random data sequence S. The encrypted data is sent to the second terminal 104 (block 402) together with an optional MAC and either an offset value O or an index number i from which the second terminal 104 can identify the n-bit key sequence. Using the offset O or the index i, as appropriate, the second terminal retrieves the n-bit key sequence Ki from the locally stored copy of the random data sequence S and decrypts the received data using the retrieved key (block 406). The second terminal 104 checks the MAC field to determine if the data was received properly. The first and second terminals 102, 104 then update their respective offset pointers to point to the next n-bit key sequence in the keypad.

Figure 7A:
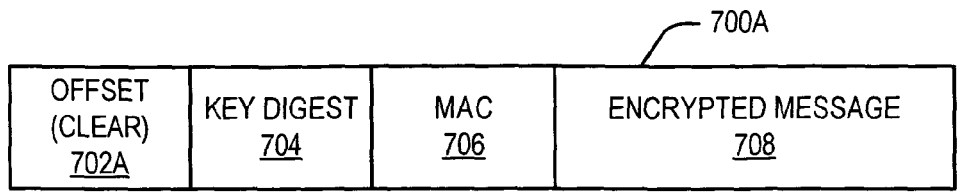
FIGS. 7A-7C illustrate message frames according to some embodiments of the invention.
Figure 7B:
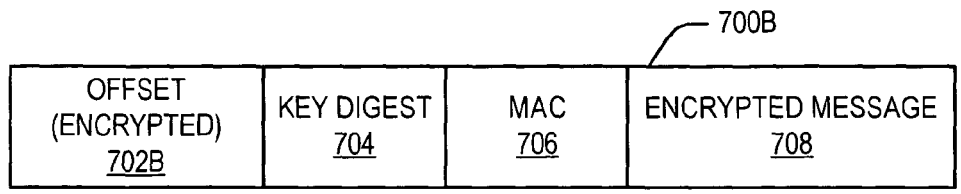
Figure 7C:
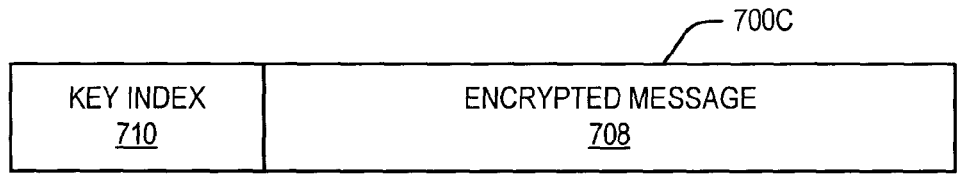

Message frames having formats according to various embodiments of the invention are illustrated in FIGS. 7A-7C. For example, a message frame 700A for a message transmitted from a first terminal to a second terminal shown in FIG. 7A includes an offset field 702A, which in the embodiments of FIG. 7A is transmitted as clear (i.e. non-encrypted) text. The frame 700A also includes an optional key digest field 704, which may contain a key digest used to uniquely identify the particular keypad being used for data encryption, and an optional MAC field 706, which, as discussed above, may be used to verify that the-contents of the message have not been altered. Finally, the frame 700A includes an encrypted message that is encrypted using a key in the keypad beginning at the offset shown in the offset field 702A.

A frame 700B according to further embodiments of the invention is illustrated in FIG. 7B. The frame 700B is similar to the frame 700A, except that in the frame 700B, the offset field 702B may be encrypted. In particular embodiments, the offset field may be encrypted using the static encryption key kr described above. It may be desirable to encrypt the offset value, particularly in systems in which portions of the keypad are re-used as encryption keys, to make it more difficult for an eavesdropper to discover any portion of the keypad. Thus, when using such a frame, the receiving terminal would first decrypt the offset field 702B to determine the offset at which the key used to encrypt/decrypt the message is located. The receiving terminal would then retrieve the appropriate key and decrypt the message.

A frame 700C according to still further embodiments of the invention is illustrated in FIG. 7B. In frame 700, the encrypted message is accompanied only by a key index field 710 which contains an index from which the key used to encrypt the message can be located in the keypad.

Figure 8:
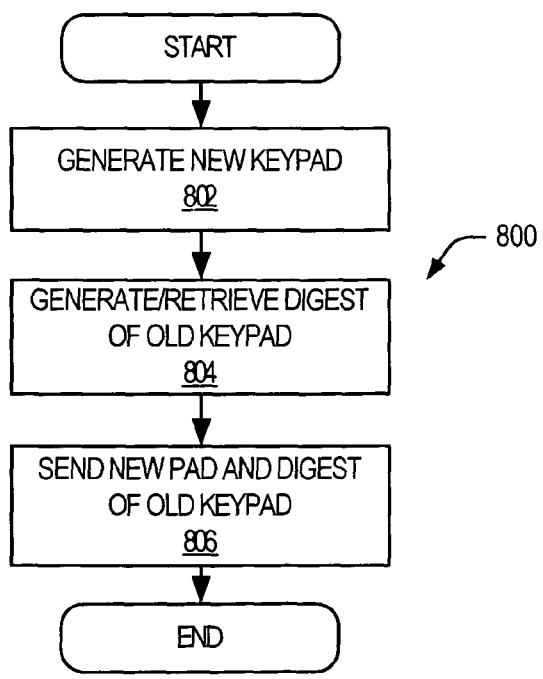
FIG. 8 is a flow diagram illustrating operations according to some embodiments of the invention.

As illustrated in the embodiments of FIG. 8, a keypad digest may be employed when updating an existing/old keypad with a new keypad. A keypad digest is a value, such as, for example, a value generated by processing the keypad with a one-way hashing algorithm, that may uniquely identify the keypad. Thus, when it is desired to implement a new keypad for communications between terminals, a terminal may generate a new keypad (block 802), generate or retrieve the digest of the old keypad (block 804), and send the new keypad and the digest of the old keypad to the second terminal (block 806). When the second terminal receives the digest of the old keypad and the new keypad, it can verify that the proper old keypad is being replaced by comparing the digest received from the first terminal with the digest of the locally-stored keypad. Accordingly, in some embodiments, it may not be necessary to send a copy of the old keypad when replacing the keypad. Since the keypad may be a very long value, substantial transmission capacity may be saved.

Authorization to replace the old keypad with a new keypad may further be confirmed by means of a PIN code supplied with the digest of the old keypad. In some embodiments, the static key kr may be used as the PIN code for authorizing the replacement of the keypad.

As will be apparent from the foregoing discussion, the rate at which the keypad is "used up" depends on how the keypad is used. (As used herein, a bit in the keypad has been "used up" when it has been used to encrypt at least one message.) For example, where the keypad is used as a source of keys having a length equal to the length of the message (such as, for example, where the message is encrypted by EXCLUSIVE-OR'ing each bit of the message with a bit from the keypad), one bit in the keypad will be used for each message bit transmitted. In that case, assuming a keypad length of L an average message length of M, the keypad will be used up after an average of L/M messages. For messages that are relatively short compared to the keypad length L, this may permit the exchange of a large number of messages before the entire keypad is used up. However, relatively long messages may use up the keypad more quickly.

In embodiments in which the keypad is used as a source of fixed-length secret keys of length n, then L/n messages may be exchanged before the keypad is used up. For example, assuming that the keypad is 1,000,000 bits in length, and assuming that a 512 bit key is used to encrypt each message, then a total of 1953 messages may be exchanged before the keypad is used up.

In some embodiments, when the keypad is used up, the communicating terminals may continue to communicate by re-using portions of the keypad as encryption keys. In some embodiments, the communicating terminals may choose different offsets and/or indices for the encryption keys, so that different bit strings may be used as keys.

Figure 9:
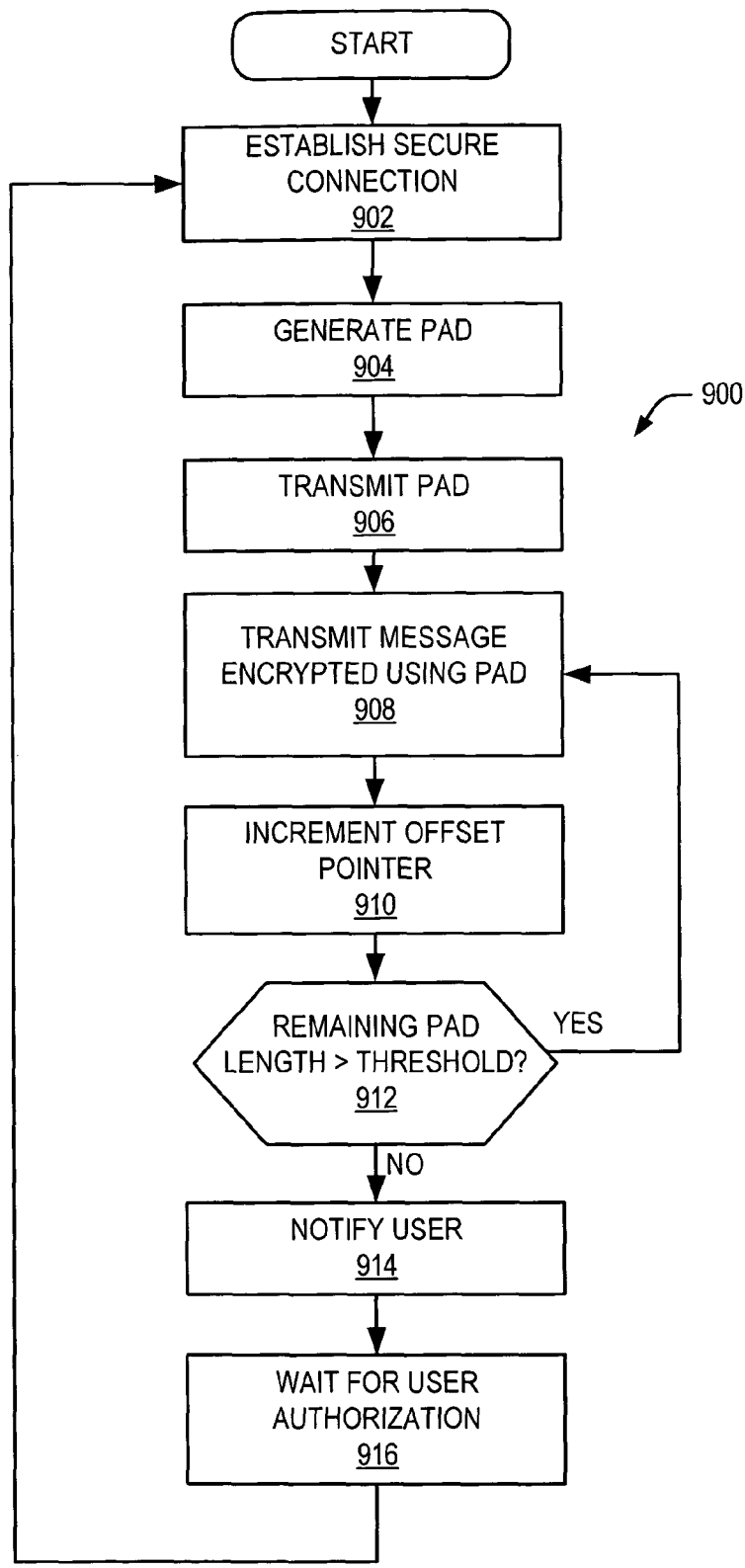
FIGS. 9-10 are flow diagrams illustrating operations according to some embodiments of the invention.

In other embodiments, the communicating terminals may generate and exchange a new keypad using a secure communication pathway when the old keypad is used up or is close to being used up. For example, referring to the embodiments of FIG. 9, operations 900 for securely transmitting data are illustrated. Initially, a physically secure communication pathway is established (block 902), for example, by means of a location-limited connection such as a direct cable connection or an infrared connection. A keypad is obtained (block 904) as an L-bit random data sequence from a noise source. The keypad is then transmitted over the physically secure communication pathway to first and second terminals (block 906). In some embodiments, the keypad may be generated at a first terminal 102 and transmitted to the second terminal 104. In other embodiments, the keypad may be generated at a key server 155 (see FIG. 2B) and transmitted from the key server to the first and second terminals. In still further embodiments, the keypad may be generated at the first terminal 102 and transmitted to the second terminal 104 via the key server 155 of FIG. 2B.

One of the first or second terminals then encrypts a message using a key obtained from the keypad and transmits the encrypted message over a physically insecure link (or, a less secure link) to the other terminal (block 908), and increments its offset pointer to point to the next location of unused key in the keypad (block 910). The terminal then compares the amount of keypad remaining to a predetermined threshold (block 912). If the remaining unused keypad length exceeds the threshold, the terminals continue to transmit encrypted messages (block 908). However, if the remaining unused keypad length is less than the threshold, the terminal notifies the user, for example by means of a notification message, a beep, and/or a screen icon that the amount of unused keypad available is running low (block 914). The terminal then waits for user authorization (block 916), and when such authorization is received, a new keypad is generated and shared (blocks 902-906).

Figure 10:
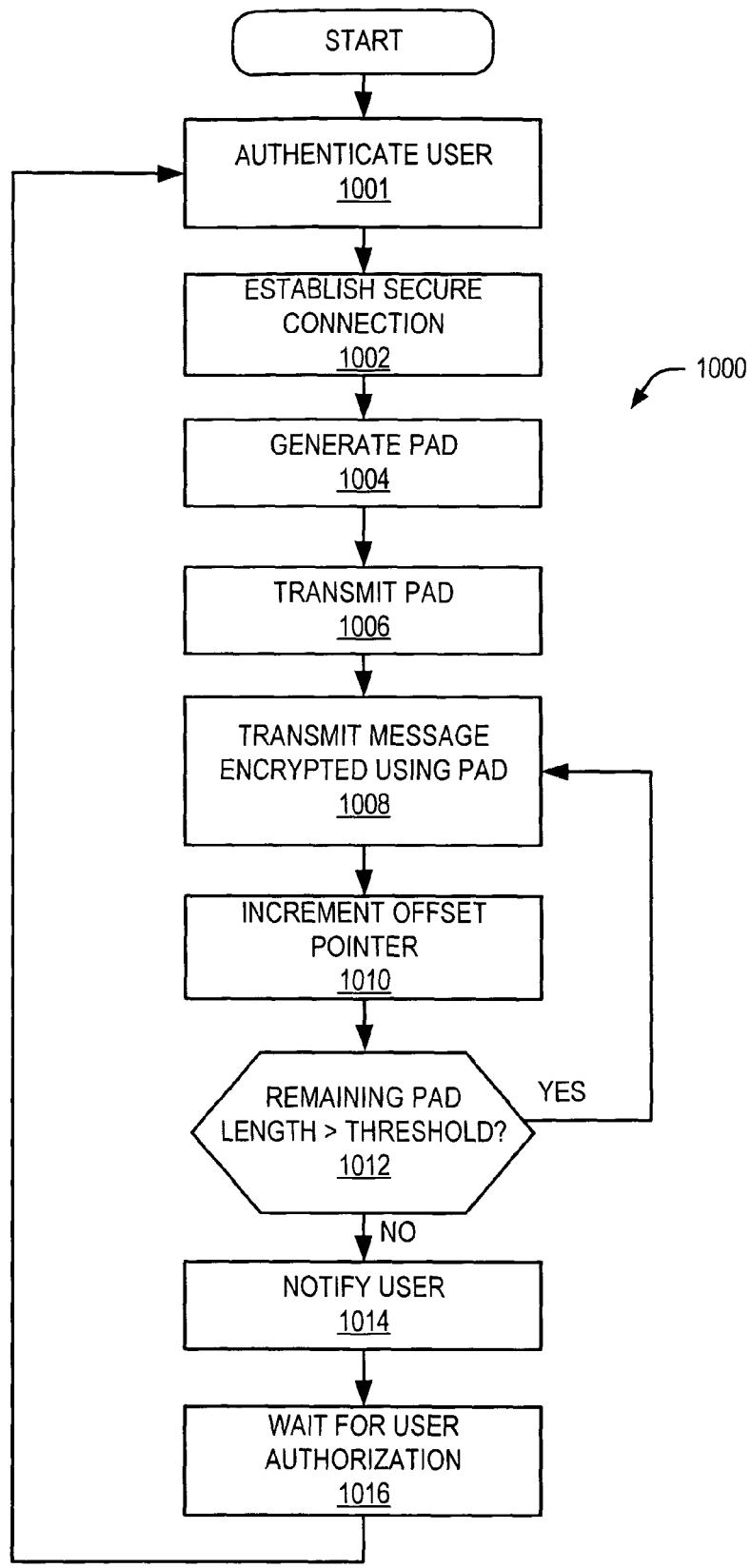

Further embodiments of the invention are illustrated in FIG. 10. Operations 1000 illustrated in FIG. 10 are similar to operations 900 illustrated in FIG. 9, except that in the operations 1000, the user of the terminal is authenticated before a new keypad is generated for additional security. Thus, the user is authenticated (block 1001) before establishing a secure connection and/or before generating a new keypad (blocks 1002, 1004). Authentication may be performed, for example, using a password. Authentication may be performed by the terminals and/or by the key server. Once the user has been authenticated, however, the keypad is generated and shared over the physically secure communication pathway (blocks 1002-1004).

One of the first or second terminals then encrypts a message using a key obtained from the keypad and transmits the encrypted message over a physically insecure link to the bother terminal (block 1008), and increments its offset pointer to point to the next location of unused key in the keypad (block 1010). The terminal then compares the amount of keypad remaining to a predetermined threshold (block 1012). If the remaining unused keypad length exceeds the threshold, the terminals continue to transmit encrypted messages (block 1008). However, if the remaining unused keypad length is less than the threshold, the terminal notifies the user, for example by means of a notification message, a beep, and/or a screen icon that the amount of unused keypad available is running low (block 1014). The terminal then waits for user authorization (block 1016), and when such authorization is received, the user is authenticated (block 1001) and a new keypad is generated (blocks 1002-1006).

Figure 11:
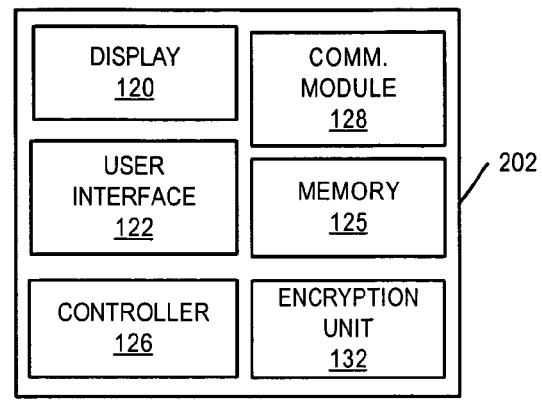
FIGS. 11-12 are schematic block diagrams illustrating wireless communication terminals and components thereof in accordance with some embodiments of the present invention.
Figure 12:
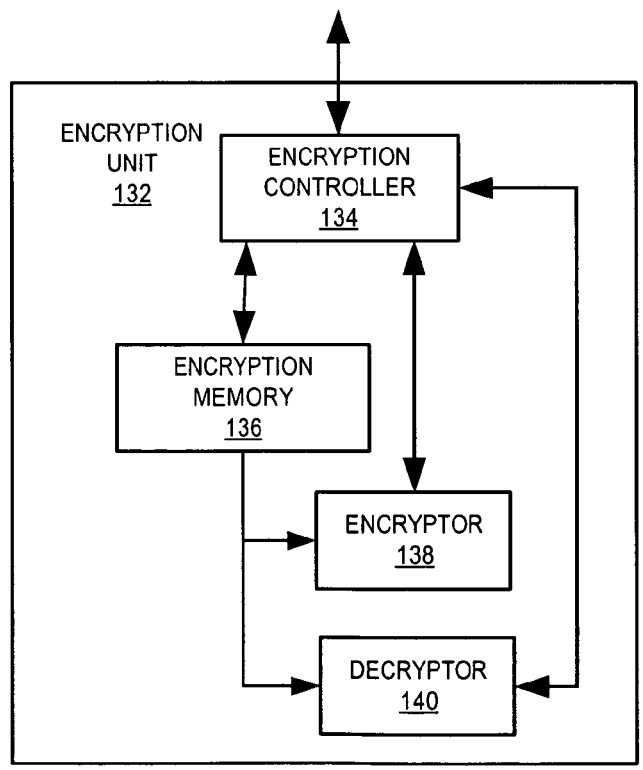

Referring now to FIG. 11, in some embodiments of the invention, data encryption and decryption may be performed in a dedicated encryption unit 132 in a terminal 202. Encryption unit 132 may be configured to communicate with the controller 126 and/or the communication module 128 of the terminal 202. As illustrated in FIG. 11, an encryption unit 132 may include an encryption controller 134 configured to communicate with other elements of terminal 202, a nonvolatile encryption memory 136, an encryptor 138 and a decryptor 140. In particular embodiments, when the terminal 202 stores the keypad, the keypad may be communicated to the encryption controller 134 of the encryption unit 132, which then stores the keypad in the nonvolatile encryption memory 136. In some embodiments, the nonvolatile memory may not be addressable by the controller 126 in order to reduce the possibility that malicious code could access the keypad. The encryptor 138 and the decryptor 140 units may have access to the nonvolatile encryption memory 136, and may be configured to encrypt/decrypt communications that are sent from or received at the terminal 202, respectively, based on the keypad stored in the nonvolatile encryption memory 136.

It will be appreciated that the various components illustrated by the blocks of FIGS. 1-3, 11 and 12, while illustrated as separate circuits, may be implemented using a variety of hardware and software. For example, portions of the terminals 102, 104, 202 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the terminals 102, 104, 202 may be integrated in a single device, such as a single ASIC, they may also be distributed among multiple devices. Functions of the various components, such as the encryption unit 132 may also be implemented as code executing on the controller 126 or may also be combined in one or more devices, such as an ASIC or DSP.

The present invention has been described with reference to FIGS. 4-7, 9 and 10. FIGS. 4-7, 9 and 10 are flowchart illustrations illustrating exemplary operations for selective encryption and decryption of messages intended for a group according to aspects of the present invention. It will be understood that blocks of the flowchart illustrations of FIGS. 4-7, 9 and 10, and combinations of blocks in the flowchart illustrations, may be implemented using electronic circuits included in communication terminals, such as the mobile terminals 102, 104, 202. It will also be appreciated that blocks of the flowchart illustrations of FIGS. 4-7, 9 and 10, and combinations of blocks in the flowchart illustrations, may be implemented using components other than those illustrated in FIGS. 1-3, 11 and 12, and that, in general, the blocks of the flowchart illustrations of FIGS. 4-7. 9 and 10 and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 4-7, 9 and 10 support electronic circuits and other means for performing the specified functions, as well as combinations of steps for performing the specified functions. It will be understood that the circuits and other means supported by each block of the flowchart illustrations of FIGS. 4-7, 9 and 10, and combinations of blocks therein, can be implemented by special purpose hardware, software or firmware operating on special or general purpose data processors, or combinations thereof.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of securely communicating a message from a first terminal to a second terminal, comprising:
    generating a keypad by the first terminal comprising a random sequence of bits having a length L;
    establishing a secure channel between the first terminal and the second terminal and transmitting the keypad from the first terminal to the second terminal over the secure channel;
    encrypting the message at the first terminal using a bit string beginning at an offset O in the keypad; and
    transmitting the encrypted message and an indicator of the offset O to the second terminal;
    the method further comprising generating a secret key using a previously generated keypad to derive the secret key, and wherein establishing the secure channel between the first terminal and the second terminal comprises establishing a secret key encrypted communication channel between the first terminal and the second terminal using the secret key derived from the previously generated keypad.

2. The method of claim 1, wherein establishing a secure channel comprises establishing a location-limited channel between the first terminal and the second terminal.

3. The method of claim 2, wherein establishing a location-limited channel between the first terminal and the second terminal comprises establishing an infrared communication channel, a direct cable connection or a Bluetooth communication channel between the first terminal and the second terminal.

4. The method of claim 1, wherein an initial public-key encrypted communication channel is established between the first terminal and the second terminal to transmit an initial keypad.

5. The method of claim 1, wherein encrypting the message at the first terminal comprises performing an EXCLUSIVE OR operation between bits in the message and the bit string in the keypad.

6. The method of claim 5, further comprising advancing an offset counter by a number equal to the number of bits used in the EXCLUSIVE OR operation.

7. The method of claim 1, wherein the indicator of the offset O is the offset O.

8. The method of claim 1, wherein the indicator of the offset O is an index number.

9. The method of claim 1, further comprising encrypting the indicator of the offset O and wherein transmitting the encrypted message and the indicator of the offset O comprises transmitting the encrypted message and the encrypted indicator of the offset O.

10. The method of claim 1, further comprising generating a key digest from the keypad and transmitting the key digest to the second terminal along with the encrypted message.

11. The method of claim 1, wherein generating the keypad comprises sampling a random noise source.

12. The method of claim 11, wherein the random noise source comprises a radio receiver tuned to a channel with no signal present.

13. The method of claim 12, further comprising:
    filtering an output of the radio receiver with a filter having a frequency response that is inverse to the passband of the receiver to thereby generate a filtered noise signal; and
    sampling the filtered noise signal.

14. The method of claim 1, further comprising:
    increasing an offset counter after transmitting the encrypted message;
    checking the offset counter to determine an amount of unused keypad; and
    generating a new keypad responsive to the amount of unused keypad being less than a predetermined threshold value.

15. The method of claim 1, further comprising authenticating a user of the first terminal prior to generating a keypad.

16. The method of claim 1, further comprising associating the generated keypad with the first terminal and the second terminal.

17. The method of claim 1, further comprising:
    calculating verification data at the first terminal; and
    transmitting the verification data along with the encrypted message to the second terminal.

18. The method of claim 17, wherein the verification data comprises a message authentication code, a CRC or a checksum.

19. The method of claim 1, wherein the length of the keypad is at least 1000 bits.

20. The method of claim 1, wherein the length of the keypad is at least 1,000,000 bits.

21. A communication system, comprising:
    a first hardware terminal configured to generate a keypad comprising a random sequence of bits having a length L, to establish a secure channel, and to transmit the keypad over the secure channel; and
    a second hardware terminal configured to establish the secure channel with the first hardware terminal and to receive the keypad over the secure channel, wherein the first hardware terminal is further configured to encrypt a message using a bit string beginning at an offset O in the keypad, and to transmit the encrypted message and an indicator of the offset O to the second hardware terminal over a physically insecure channel; and
    the first hardware terminal is configured to generate a secret key using a previously generated keypad to derive the secret key, and to establish the secure channel by establishing a secret key encrypted communication channel between the first hardware terminal and the second hardware terminal using the secret key derived from the previously generated keypad.

* * * * *